Patented Mar. 12, 1946

2,396,607

UNITED STATES PATENT OFFICE 2,396,607

DISPERSIONS AND THEIR USE

Thomas H. Rogers, Jr., Akron, Ohio, assignor to Wingfoot Corporation, Akron, Ohio, a corporation of Delaware No Drawing. Application November 17, 1942, Serial No. 465,905

2 Claims. (Cl. 260—8)

This invention relates to dispersions of polyvinyl acetals and their use as calking compounds, particularly in contact with a metal. The dispersons are water dispersions in which the water forms the continuous phase. In a preferred form of the invention the amount of water employed is such as to give the dispersion a putty-like consistency. The polyvinyl acetal may contain a plasticizer, and the addition of a small amount of an organic solvent may at times be desirable.

The polyvinyl acetals are formed by the condensation of an aldehyde with a partially hydrolyzed polyvinyl ester. They comprise polyvinyl acetal, polyvinyl butyral, etc. The invention relates particularly to the use of polyvinyl butyral, such as is produced commercially under the trade name of Butvar and under the trade name of Butacite.

In preparing the dispersion, the polyvinyl butyral resin may first be milled on a rubber mill until it is heated to a fairly soft condition. Dibutyl sebacate or other plasticizer may be added. It is preferably added slowly so that it is completely dispersed as it is added. The resin may then be transferred to the type of mixer known in the rubber art as a banbury, and sodium oleate or other fatty-acid salt is added. The oleate is preferably incorporated by first adding oleic acid and then sodium hydroxide. Instead of being transferred to the banbury, the entire mixing operation may be conducted on the rubber mill.

In the specific example described below the sodium hydroxide was added in the form of pellets which were dusted with zinc-oxide powder to prevent the sodium hydroxide from taking on water before reacting with the oleic acid. This mixture of sodium hydroxide and zinc oxide was added a little at a time, and each time the plastic mass broke up into fine ribbons, but came back again into a rubbery mass after a short time. A casein solution was then added slowly, and then water was added in small additions. As the amount of water was increased, the stock became easier to mix, and the power consumption decreased. After the stock was approximately 70 per cent solids, the emulsion inverted so that the water formed the continuous phase. After this, it was possible to add the water much faster. It was found necessary to continue the addition of water beyond this inversion point to prevent the stock from breaking up into small lumps instead of dispersing.

The temperature used in compounding the ingredients according to the following formula may be about 185° F. It will be found that the most desirable temperature will depend upon the amount of plasticizer, etc., which is present. The following formula is illustrative:

| | Parts |
|---|---|
| Polyvinyl butyral | 73.0 |
| Dibutyl sebacate | 27.0 |
| Oleic acid | 5.0 |
| NaOH/ZnO (1:1) | 2.5 |
| Casein | 2.4 |
| Water | 160.1 |

At 185° F. the above formula will be thin and about the viscosity of water. When cooled to room temperature, a dispersion of about 45 per cent solids content will form a pasty, putty-like mass.

Carbon black, clay, and other fillers may be added in various proportions as, for example, in amounts anywhere from five parts to thirty or forty parts. Such filler is advantageously added after the plasticizer and before the oleic acid.

To make a thinner, softer putty which will harden on standing, a small amount of solvent is advantageously compounded with the other ingredients as, for example, by adding 5, 10 or 20 per cent of ethyl alcohol or methyl ethyl ketone to the above formula. The solvent softens the polyvinyl butyral and renders the putty more plastic, but after mixing and using, the solvent will evaporate, and the putty will lose this added plasticity. The use of solvents may likewise be desirable to increase the adhesion of dispersion when used as a calking compound as, for example, in calking between aluminum sheets which have been coated with a chromate primer according to the usual practice.

The production of the dispersion or putty may, of course, be varied. The addition of plasticizer aids in handling and working the resin on a mill or other mixer. Volatile solvent may replace all or part of the plasticizer. Plasticizers have different effects on the resins. To aid in the preparation of the dispersion, a plasticizer should be used which softens the resin.

In producing the dispersion, other dispersing agents than the oleate and casein may be employed. Likewise, the proportions of the various ingredients may be modified. Although larger and smaller amounts of aqueous material may be added, the invention relates particularly to emulsions which are of putty-like consistency.

The putty has been found particularly valuable for calking seams and the like which occur between metal surfaces. The metal may be aluminum and its alloys, steel, copper, etc. The putty can also be used in calking plastic surfaces or plywood surfaces. In order to improve adhesion of the calking compound to the plastic surface, a common solvent to the plastic and calking compound base can be incorporated during the process of making the calking mixture.

For example, in making pontoons, gasoline tanks, etc., liquid-tight, the dispersion of this invention will be found particularly valuable. It gives sufficient adhesion to the metal for this purpose, and the polyvinyl acetals are not appreciably attacked by either gasoline or water. After evaporation of the aqueous phase, the putty is highly flexible and adheres well to the metal surfaces as, for example, to the aluminum alloy surfaces which have been treated in the usual way with a chromate primer. The putty does not dry out, but remains permanently flexible, and if it is desired to remove it from the metal surface, it can be peeled off, leaving a clean surface.

The calking compound is designed particularly for use in sealing cabins, wings, etc., for planes which are to be used at high altitudes. The plastic windows used in planes are a source of "pressure leaks" and the putty or calking compound of this invention can be used to calk around the junction of the plastic with the rest of the plane. The calking compound adheres to both the plastic window and the adjoining surface whether it be metal, plywood, etc. It will adhere to practically any organic structural plastic (whether or not it contains fillers), such as acrylate, methacrylate, urea-formaldehyde, phenol-formaldehyde, and other plastics including laminated wood and other structural members in which such plastics are employed and form at least a part of the surface to which the putty or calking compound may adhere.

What I claim is:

1. The method of preparing a calking compound which comprises the steps of heating a polyvinyl acetal to a temperature of about 185° F., adding a dispersing agent comprising a mixture of casein and sodium oleate and adding water in an amount sufficient to form a dispersion containing between about 45 percent and about 70 percent solids in which the water is the continuous phase.

2. The method of preparing a calking compound which comprises the steps of heating a polyvinyl acetal to a temperature of about 185° F., adding a dispersing agent comprising a mixture of casein, oleic acid and sodium hydroxide dusted with zinc oxide and adding water in an amount sufficient to form a dispersion containing between about 45 percent and about 70 percent solids in which the water is the continuous phase.

THOMAS H. ROGERS, Jr.